(No Model.)
C. W. HOLTZER.
ELECTRIC GAS LIGHTING BURNER.
No. 338,747. Patented Mar. 30, 1886.
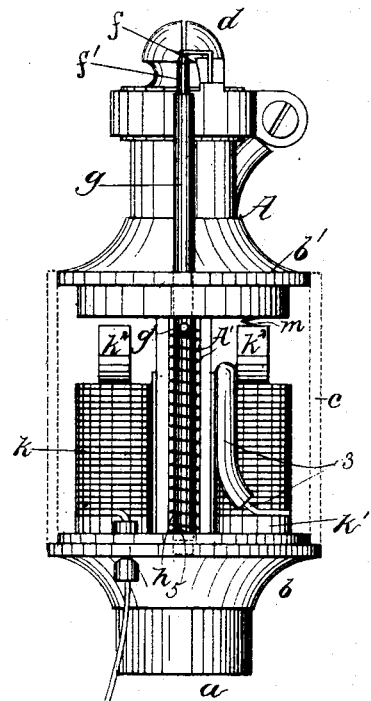
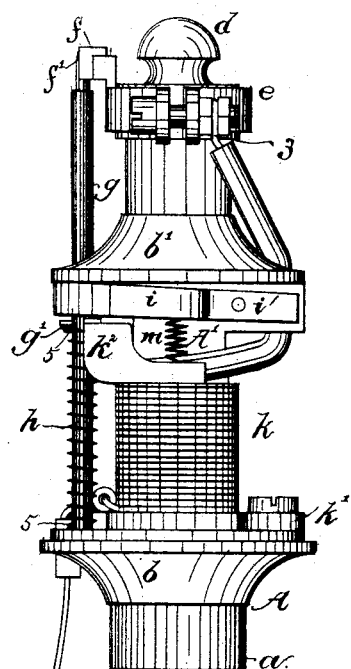
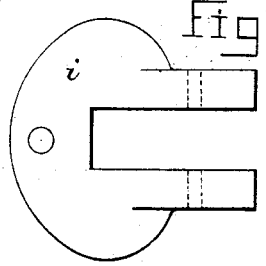
Witnesses.
Henry Marsh.
Arthur Lipperton.
Inventor,
Charles W. Holtzer.
by Crosby & Gregory atty's

UNITED STATES PATENT OFFICE.

CHARLES W. HOLTZER, OF BROOKLINE, MASSACHUSETTS.

ELECTRIC GAS-LIGHTING BURNER.

SPECIFICATION forming part of Letters Patent No. 338,747, dated March 30, 1886.

Application filed May 12, 1884. Serial No. 131,143. (No model.)

*To all whom it may concern:*

Be it known that I, CHARLES W. HOLTZER, of Brookline, county of Norfolk, State of Massachusetts, have invented an Improvement in Electric Gas-Lighters, of which the following description, in connection with the accompanying drawings, is a specification, like letters on the drawings representing like parts.

My invention relates to an electric gas-lighter of that class in which an electro-magnet is employed to operate electrodes located near the jet of gas to separate the said electrodes and thereby produce a spark. In devices of this class as heretofore made the armature of the magnet engages a movable electrode or member of a circuit-breaker in its own circuit and moves the same to break the said circuit, and thus produce the spark, and a spring acting on the said movable electrode tends to move it back to close the circuit, the said spring also constituting the retractor for the armature of the magnet, moving the said armature away from the poles of the magnet.

The armature of the electro-magnet of the class referred to engages the movable electrode of the circuit-breaker at or very near the beginning of the movement toward the poles of its magnet, thereby producing a slow or gradual break in the circuit and obtaining but a feeble spark, whereas in the present invention the armature of the electro-magnet nearly completes its entire movement toward the poles of its magnet before it engages the movable electrode to break the circuit. By the armature engaging the movable electrode near the poles of its magnet the intensity of the current flowing through the circuit of the gas-lighter, herein to be described, is much greater than in the other cases referred to, inasmuch as no resistance is thrown into the circuit until the armature, after having acquired a considerable velocity, strikes a pin or other device on the movable electrode and breaks the circuit, thereby producing a strong spark, whereas in other gas-lighters the armature engages the movable electrode at or very near the moment it begins to move toward the poles of its magnet, thereby throwing in a gradually-increasing resistance, thus diminishing the strength of the current and producing but a feeble spark.

My invention consists of a burner composed of a casting having circular flanges and a flattened body portion between them, and a longitudinal gas-passage and a circuit-breaker having a movable electrode on a spring-pressed rod longitudinally movable in passages in the flanges of the burners, and an electro-magnet having flattened coils at either side of the flattened portion of the burner, and poles offset from the axial line of the said coils, and a pivoted armature slotted to embrace the said flattened body of the burner.

Figures 1 and 2 are elevations of a gas-lighting apparatus embodying this invention, the plane of projection being at right angles to one another; and Fig. 3 a plan view of the armature detached.

The apparatus is supported on and connected with a burner, consisting of a casting, A, having its neck *a* threaded or otherwise adapted to be connected with the gas-pipes in the usual manner.

The burner A has flanges *b b'*, between which the main operative parts are included, they being incased by a suitable cover or shell indicated in dotted lines at *c*, Fig. 1. The extremity of the burner is provided with the usual tip or jet piece, *d*, having adjacent to it but insulated from it a metal collar provided with one electrode, *f*, of the circuit-breaker by which the spark is produced. The other or movable electrode, *f'*, of the said circuit-breaker is connected with a rod, *g*, having a longitudinal movement in suitable openings in the flanges *b b'*, the said rod being acted upon by a spring, *h*, tending to keep the electrode *f'* in contact with the electrode *f*. The circuit is continued from the rod *g* to the main casting A, and in order to insure a proper electrical connection of uniform resistance the said spring is soldered at one end to the said rod, and at the other end to the flange *b*, as shown at 5. The electrode *f'* is separated from the one, *f*, to cause an interruption in the current and produce a spark in the gas issuing from the jet *d* by the armature *i* of an electro-magnet, *k*. The said armature is slotted to embrace the center or shank portion, A', of the burner, which is bored to afford a passage for the gas, and the said armature is pivoted at *i'* on the side of the burner remote from the rod *g*, which passes through an opening in the said armature. The back strap or base, *k'*, of the magnet $k$ is also slotted or forked to embrace the central portion, $A'$, of the burner, and its poles $k^2$ are offset on the side toward the rod $g$, as shown in Fig. 2, so that its attractive force operates with proper leverage on the armature $i$ to cause it to turn on its pivot, although the coils of the magnet are set at the middle of the burner, and thus occupy much less space with relation to the burner than if the entire magnet were set at one side, so as to draw on the armature $i$ in line with its axis. The said armature $i$ is provided with a retracting-spring, $m$, holding it away from the poles of the magnet at such a distance therefrom as to afford a considerable movement of the said armature when attracted by the magnet. A short time before the end of the said movement the said armature engages a pin or projection, $g'$, on a rod, $g$, located just above the level of the surfaces of the pole-pieces, the armature near the termination of its attracted movement striking the said pin or projection and quickly separating the electrodes $f\,f'$, thus producing a strong spark and at the same time demagnetizing the magnet $k$ in the usual manner, the said magnet being connected in circuit by wires 2 3 with the collar $e$ and electrodes $f\,f'$. The armature thus acquires considerable momentum before engaging the rod $g$ to move the electrode, and when the circuit is broken at $f\,f'$ the retraction-spring $m$ throws the armature back to its fullest extent, in readiness to be again operated, as described, to break the circuit when the full current is flowing, thereby producing an effective spark.

When the retracting-spring $m$ is omitted and the spring $h$ is depended upon both to close the electrodes and retract the armature, the latter cannot give to the movable electrode a strong quick movement to separate the electrodes sharply and produce a strong spark.

The cores and coils of the magnet $k$ are flattened, as shown, and by locating them at the middle of the burner and offsetting the poles $k^2$ the entire apparatus is made very compact, being but little more bulky than a burner without the lighting devices.

I claim—

The burner composed of a casting having circular flanges and a flattened body portion between them, with a longitudinal gas-passage, combined with a circuit-breaker having a movable electrode on a spring-pressed rod longitudinally movable in passages in the flanges of the burner, an electro-magnet having flattened coils at either side of the flattened portion of the burner, and poles offset from the axial line of the said coils, and a pivoted armature slotted to embrace the said flattened body of the burner, substantially as described.

In testimony whereof I have signed my name to this specification in the presence of two subscribing witnesses.

CHARLES W. HOLTZER.

Witnesses:
   JOS. P. LIVERMORE,
   B. J. NOYES.